(12) United States Patent
Asakura

(10) Patent No.: US 9,212,710 B2
(45) Date of Patent: Dec. 15, 2015

(54) VEHICLE DISC BRAKE

(71) Applicant: NISSIN KOGYO CO., LTD., Ueda, Nagano (JP)

(72) Inventor: Ryoma Asakura, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 78 days.

(21) Appl. No.: 14/073,353

(22) Filed: Nov. 6, 2013

(65) Prior Publication Data
US 2014/0124304 A1 May 8, 2014

(30) Foreign Application Priority Data

Nov. 8, 2012 (JP) ................................. 2012-246564

(51) Int. Cl.
*F16D 55/226* (2006.01)
*F16D 55/227* (2006.01)
*F16D 65/097* (2006.01)

(52) U.S. Cl.
CPC ............ *F16D 55/227* (2013.01); *F16D 65/097* (2013.01)

(58) Field of Classification Search
CPC ....... F16D 55/26; F16D 55/31; F16D 55/227; F16D 65/18; F16D 65/0972; F16D 65/0977; F16D 65/0978; F16D 65/0979; F16D 2055/0058; F16D 65/024
USPC .............................................. 188/72.3, 73.38
See application file for complete search history.

(56) References Cited

U.S. PATENT DOCUMENTS

| 4,491,204 | A | * | 1/1985 | Dirauf | F16D 65/097 116/208 |
| 5,310,024 | A | * | 5/1994 | Takagi | F16D 65/092 188/72.3 |
| 5,511,638 | A | * | 4/1996 | Tsuruta | F16D 65/0975 188/72.3 |
| 2002/0125080 | A1 | * | 9/2002 | Hikari | F16D 55/228 188/72.3 |
| 2003/0192749 | A1 | * | 10/2003 | Barbosa | F16D 65/0973 188/72.3 |

FOREIGN PATENT DOCUMENTS

| JP | UM-S56-104637 | 8/1981 |
| JP | 2552633 B | 10/1997 |
| JP | 2012072830 A | 4/2012 |

OTHER PUBLICATIONS

Japanese Office Action for related JP application No. 2012-246564, drafted Oct. 15, 2014, dated Oct. 21, 2014, 4 pages.

\* cited by examiner

*Primary Examiner* — Anna Momper
*Assistant Examiner* — San Aung
(74) *Attorney, Agent, or Firm* — Andrew M. Calderon; Roberts Mlotkowski Safran & Cole, P.C.

(57) ABSTRACT

One embodiment discloses a vehicle disc brake including: a disc rotor; a pair of friction pads disposed on both side portions of a disc rotor; and a pads returning spring suspended over radially outer sides of the friction pads and over an outer circumferential side of the disc rotor and configured to pull the friction pads away from the disc rotor when brakes are released and hydraulic pressure is removed. The pads returning spring has a base portion extending in an axial direction of the disc rotor, first spring portions extending from both end portions of the base portion, and engagement portions provided individually at distal ends of the first spring portions so as to engage with the friction pads. Further, a middle portion of the base portion is depressed in a direction in which the first spring portions extend as a second spring portion.

19 Claims, 8 Drawing Sheets

VEHICLE DISC BRAKE

CROSS-REFERENCE TO RELATED APPLICATION(S)

This application claims priority (priorities) from Japanese Patent Application No. 2012-246564 filed on Nov. 8, 2012, the entire contents of which are incorporated herein by reference.

FIELD

The present invention relates to a vehicle disc brake which is mounted on a vehicle designed to be driven such as a motor vehicle and more particularly to a vehicle disc brake which includes a pads returning spring which pulls friction pads in directions opposite to a disc rotor or in which they move away from the disc rotor when the brakes are released and hydraulic pressure is removed.

BACKGROUND

In some of conventional vehicle disc brakes, a pads returning spring is suspended over radially outer sides of a pair of friction pads which are disposed on both side portions of a disc rotor for pulling the pair of friction pads in directions opposite to the disc rotor or in which they move away from the disc rotor when the brakes are released and hydraulic pressure is removed. As such a pads returning spring, there has been a pads returning spring including a bend portion which is formed by bending back a wire spring into a substantially U-shape or substantially V-shape, a pair of spring portions which extend from the bend portion in a direction in which they are spaced away from each other as they extend and friction pad engagement portions which project from distal ends of the spring portions towards the corresponding friction pads, wherein the friction pad engagement portions are installed individually in engagement holes which are opened in the radially outer sides of the pair of friction pads, and the bend portion is disposed over a circumferential outer side of the disc rotor (for example, refer to JP-UM-2552633-B and JP-2012-072830-A).

In a pads returning mechanism which employs a pads returning spring like those described in JP-UM-2552633-B and JP-2012-072830-A, friction pads are biased to be pulled from a disc rotor by the restoring force of the pads returning spring when the brakes are released and hydraulic pressure is removed over a period from an initial stage where the pads are totally new to a stage near a worn-out state (a pad replacement stage) in their service lives.

Meanwhile, it has been desired that when the wear of the friction pad exceeds a preset wear amount, for example, a wear amount just prior to the stage near the fully worn-out state (the pad replacement stage), the friction pads are biased to be pulled from the disc rotor in a more ensured fashion when the brakes are released and hydraulic pressure is removed so as to suppress the wear of the friction pads due to the drag of the linings.

SUMMARY

An aspect of the present invention provides a vehicle disc brake including:
 a disc rotor;
 a pair of friction pads disposed on both side portions of a disc rotor; and
 a pads returning spring suspended over radially outer sides of the friction pads and over an outer circumferential side of the disc rotor and configured to pull the friction pads away from the disc rotor when brakes are released and hydraulic pressure is removed, the pads returning spring having
  a base portion extending in an axial direction of the disc rotor,
  first spring portions extending from both end portions of the base portion along an outer circumference of the disc rotor while moving away from each other, and
  engagement portions provided individually at distal ends of the first spring portions so as to engage with the friction pads, and
 wherein a middle portion of the base portion in the axial direction of the disc rotor is depressed in a direction in which the first spring portions extend, thereby forming a second spring portion.

There may be provided, based on the above-mentioned aspect, the vehicle
 wherein the pads returning spring is configured such that, when the brakes are applied, the second spring portion starts to be elastically deformed after the first spring portions are elastically deformed.

There may be provided, based on the above-mentioned aspect, the vehicle
 wherein the pads returning spring is configured such that, when the brakes are not applied and the friction pads are in initial positions, only the first spring portions are elastically deformed as long as the friction pads are totally new or wear less than a previously-set wear amount, and both of the first spring portions and the second spring portion are elastically deformed if the friction pads wear more than the previously-set wear amount.

There may be provided, based on the above-mentioned aspect, the vehicle
 wherein the engagement portions of the pads returning spring are brought into engagement with portions of the friction pads at a side from which the disc rotor enters into the vehicle disk brake when a vehicle travels ahead.

There may be provided, based on the above-mentioned aspect, the vehicle further including:
 a caliper body which has a ceiling opening portion formed to visually expose the base portion therethrough.

According to the vehicle disc brake of the invention, the pads returning spring includes the base portion which is provided to extend in the direction of the disc axis, the pair of first spring portions which extend from both the end portions of the base portion along the outer circumference of the disc rotor while moving away from each other, and the engagement portions which are provided individually at the distal ends of the first spring portions for engagement with the friction pads, and the base portion includes the second spring portion which is formed by depressing the middle portion in the direction of the disc axis of the base portion in the direction in which the first spring portions extend. Therefore, when the brakes are released and hydraulic pressure is removed, the friction pads can be pulled from the disc rotor by the restoring forces of the first spring portions and the second spring portion.

Since the second spring portion starts to be elastically deformed after the first spring portions are elastically deformed when the brakes are applied, in the event that the compressed deformation amount of the first spring portions increases when the brakes are applied, the friction pads can be pulled away from the disc rotor by the restoring forces of both the first spring portions and the second spring portion.

When the friction pads wear to exceed the previously-set wear amount, with the friction pads staying in the non-brake-applied position, in the pads returning spring, the first spring portions and the second spring portion are elastically deformed, whereby the restoring forces of the first spring portions and the second spring portion are applied from the initial stage of brake application so as to pull the friction pads away from the disc rotor in an ensured fashion.

The engagement portions of the pads returning spring are brought into engagement with the disc entrance sides of the friction pads which result when the vehicle travels ahead, whereby the friction pads can be pulled away from the disc rotor with good efficiency when the brakes are released and hydraulic pressure is removed. Since the base portion is disposed in the position which corresponds to the ceiling opening portion which is formed in the caliper body, the base portion can be visualized from the ceiling opening portion.

DETAILED DESCRIPTION

Figure 1:
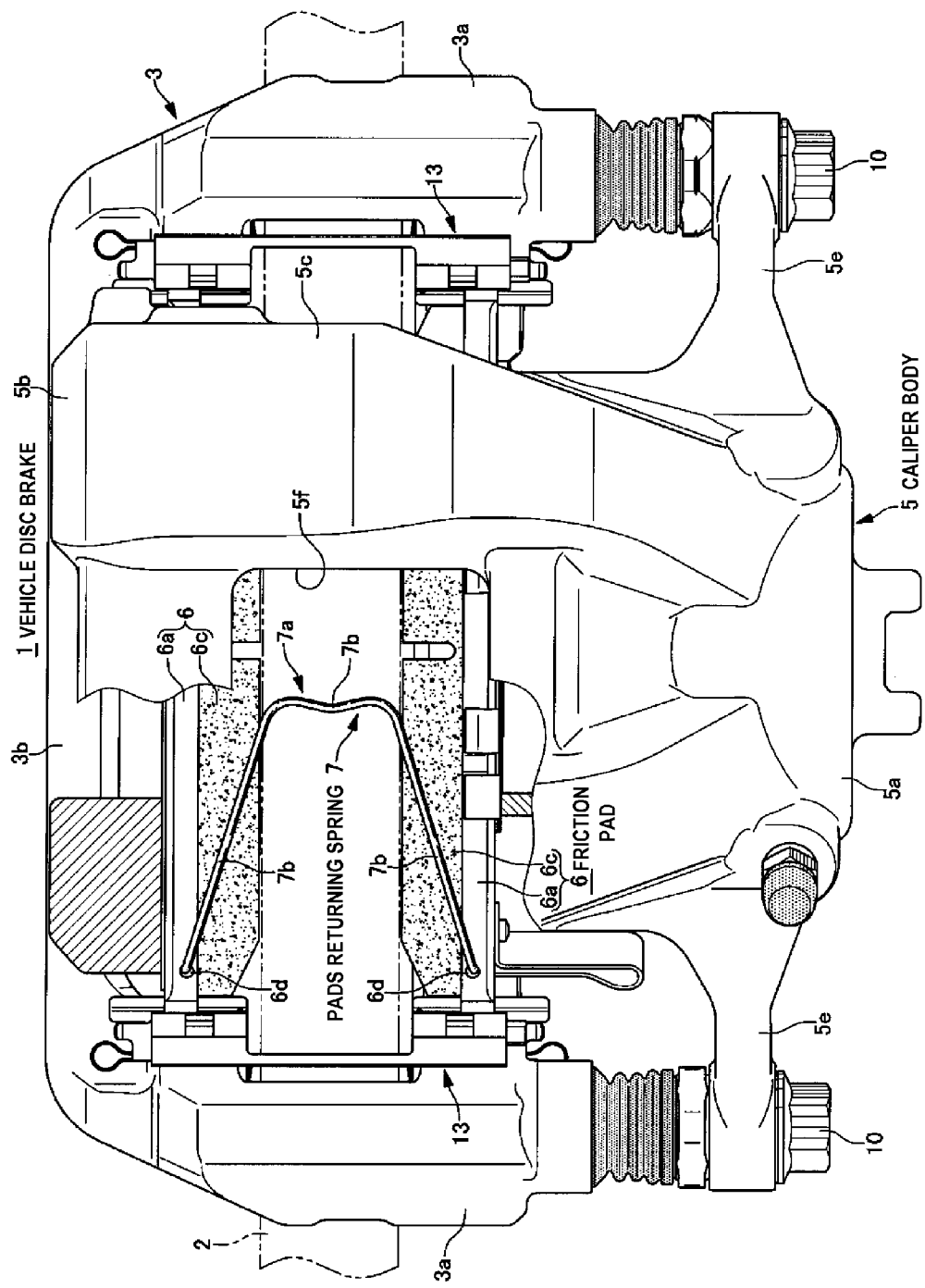
FIG. 1 is a partially sectional plan view of a vehicle disc brake showing an embodiment of the invention.
Figure 2:
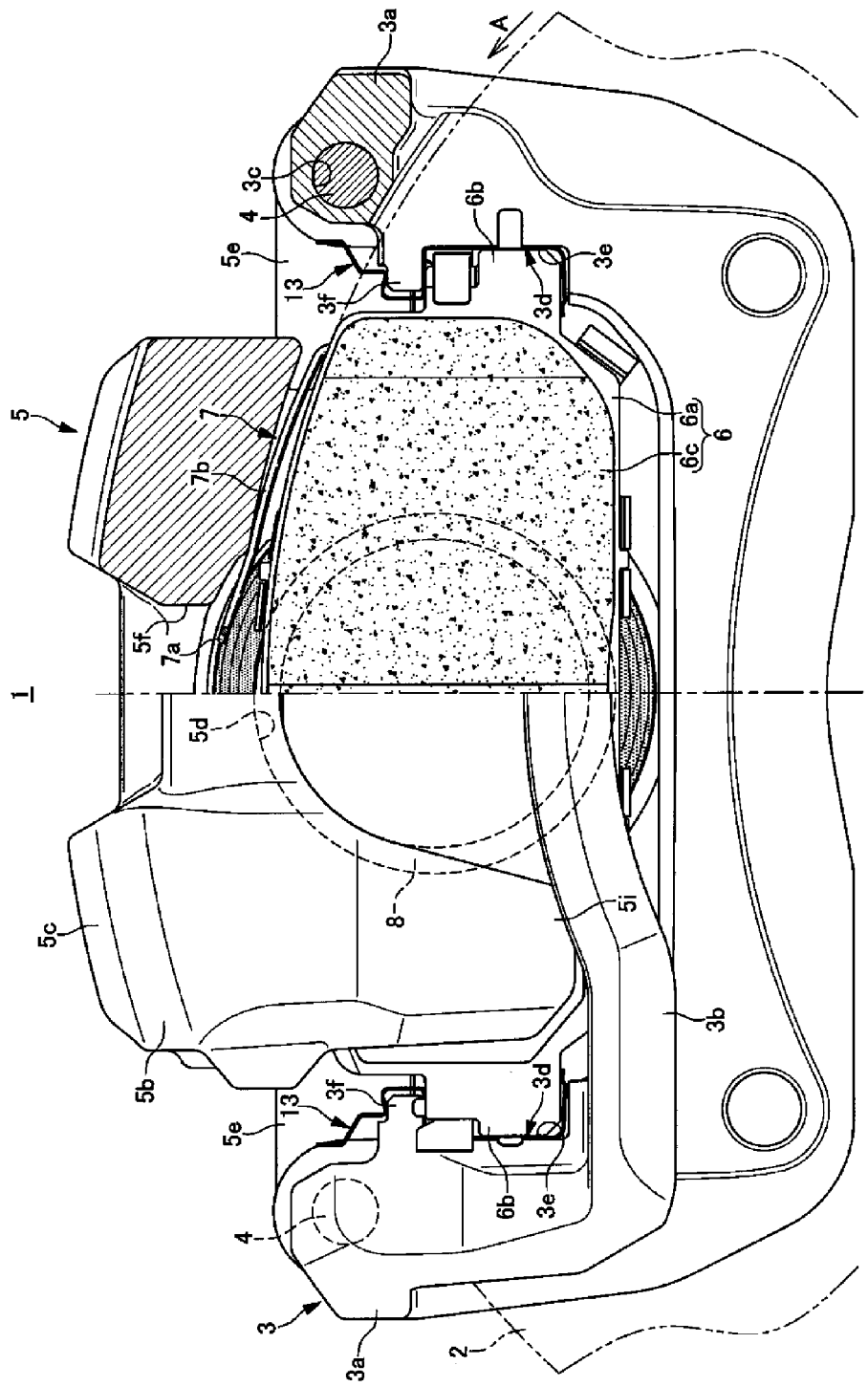
FIG. 2 is a partially sectional rear view of the vehicle disc brake.
Figure 3:
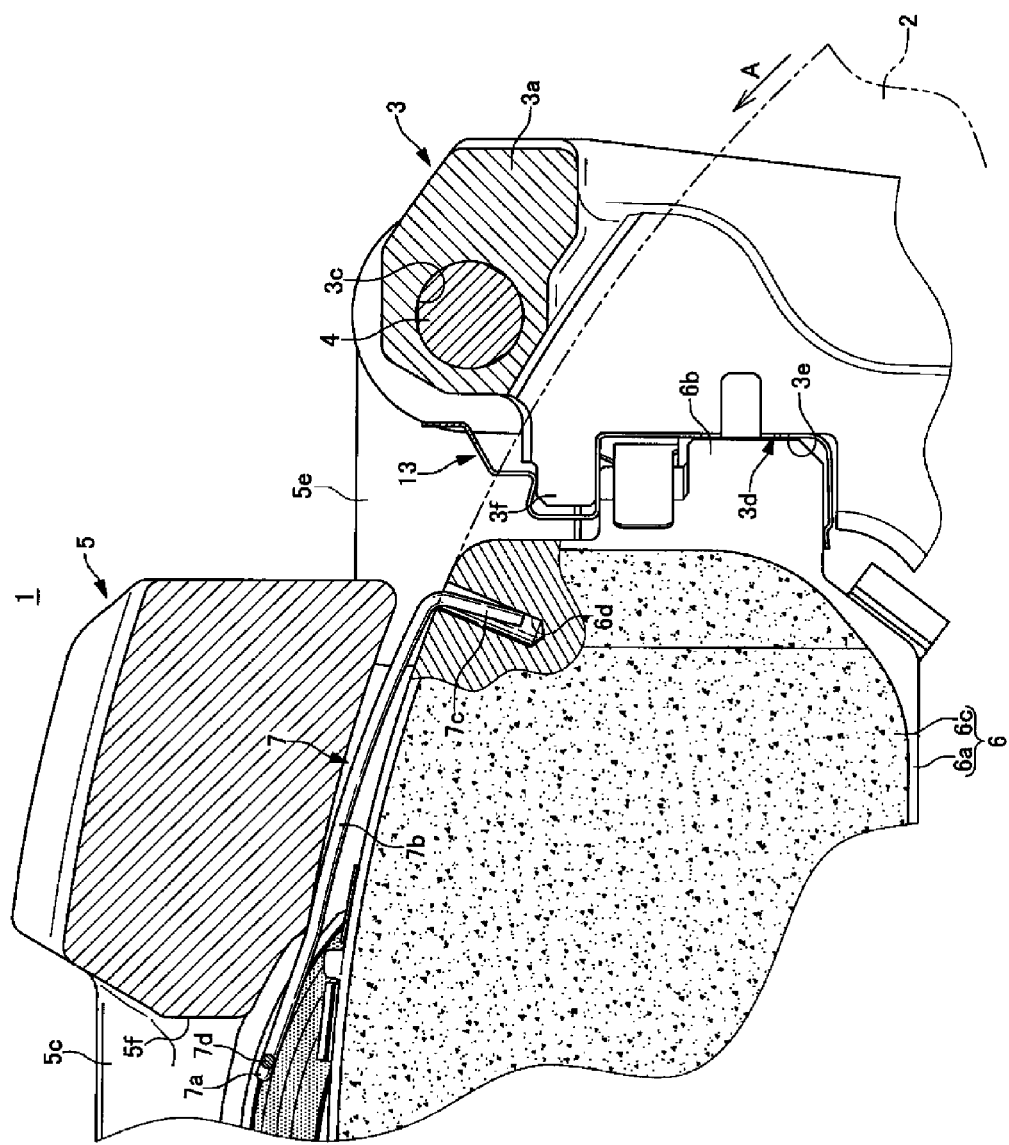
FIG. 3 is an enlarged sectional view of a main part of the vehicle disc brake.
Figure 4:
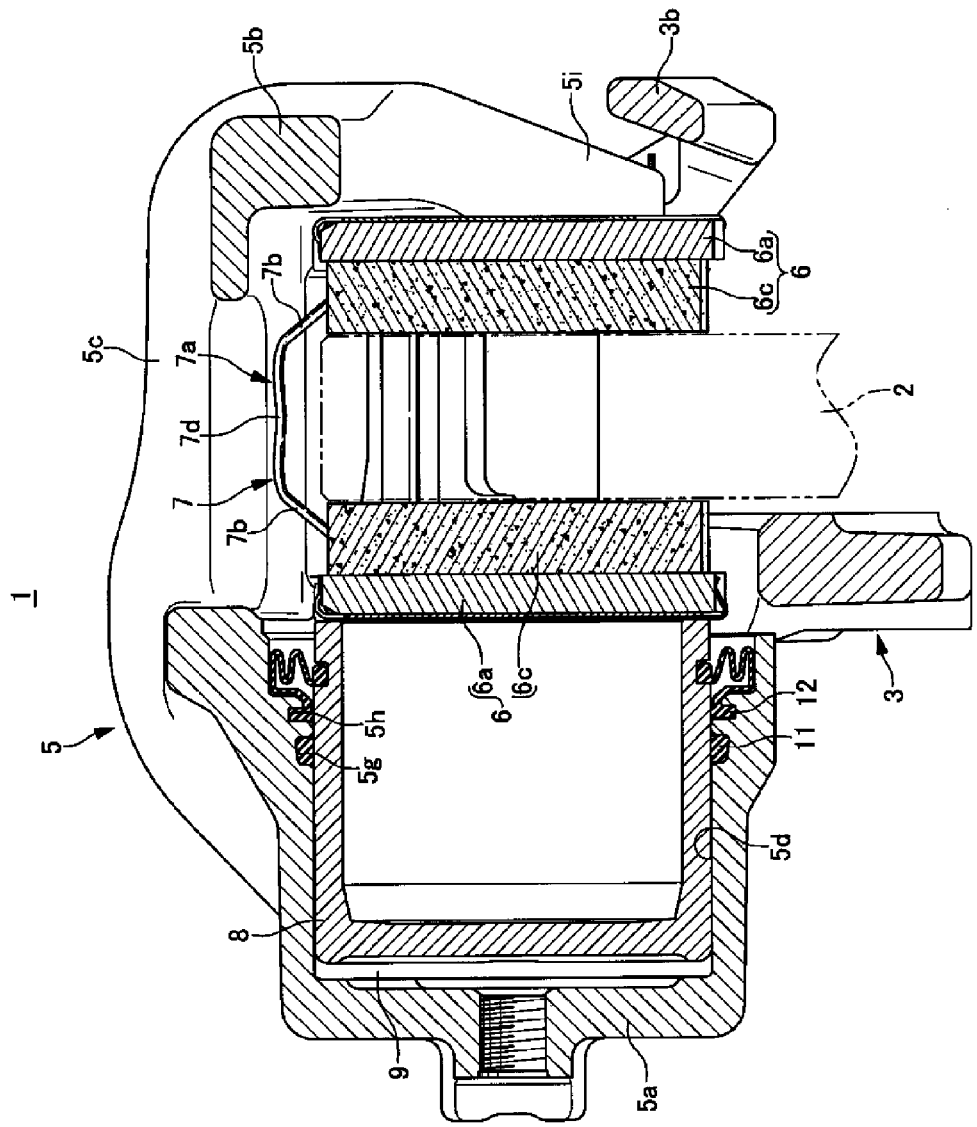
FIG. 4 is a sectional view taken along the line IV-IV in FIG. 5.
Figure 5:
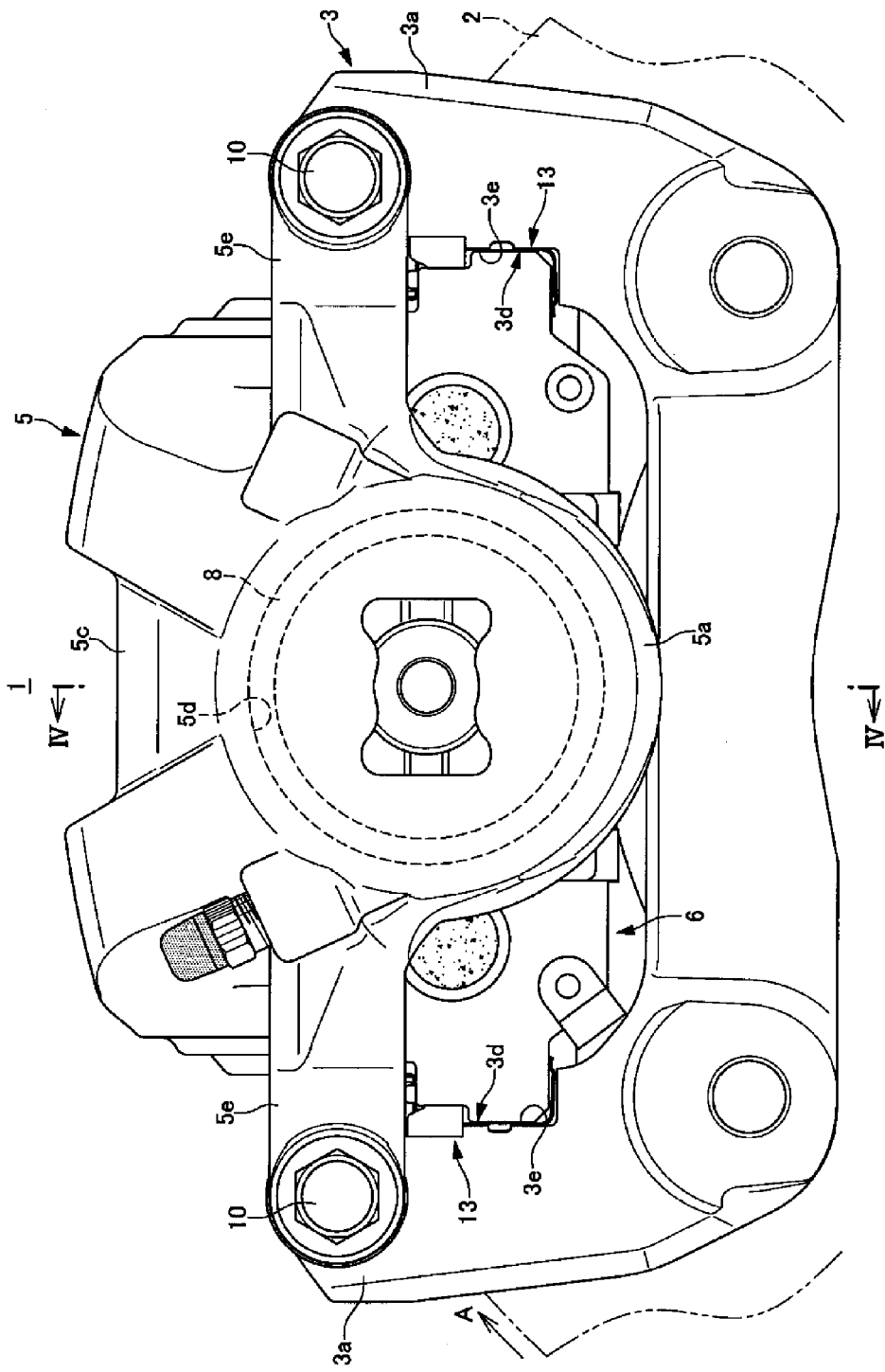
FIG. 5 is a front view of the vehicle disc brake.
Figure 6:
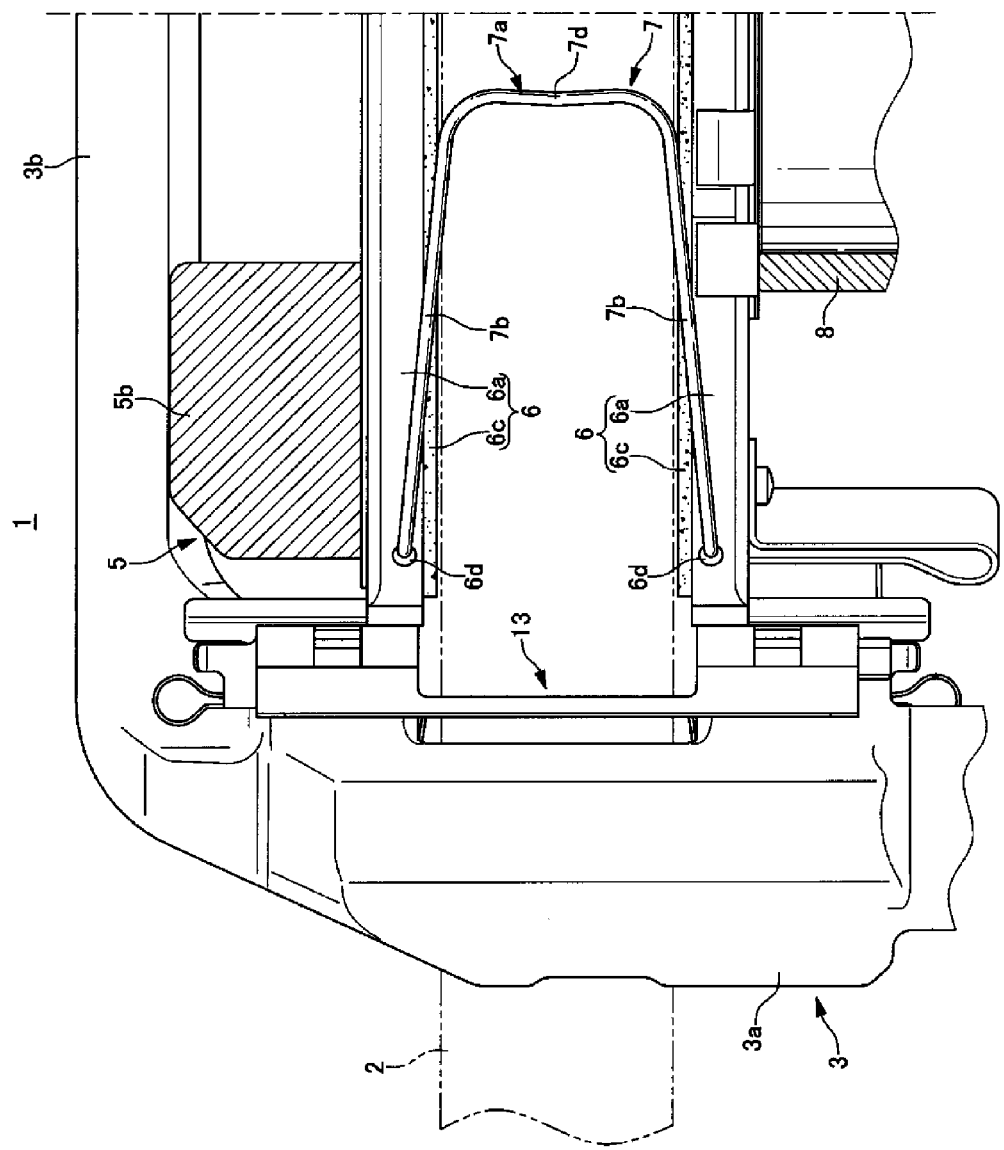
FIG. 6 is an explanatory diagram of the vehicle disc brake when friction pads have worn to exceed a preset wear amount.

FIGS. 1 to 6 show an embodiment of a vehicle disc brake of the invention. An arrow A indicates a rotational direction of a disc rotor which rotates together with a wheel when a vehicle travels ahead. When referred to in the following description, a disc exit side and a disc entrance side mean sides of a caliper where a disc rotor exits and enters, respectively, when the vehicle travels ahead.

A vehicle disc brake 1 includes a disc rotor 2 which rotates together with a wheel, a caliper bracket 3 which is fixed to a vehicle body on one side portion of the disc rotor 2, a caliper body 5 which is supported by caliper support arms 3a, 3a of the caliper bracket 3 so as to move in the direction of a disc axis via a pair of slider pins 4, 4, and a pair of friction pads 6, 6 which are disposed to face each other across the disc rotor 2 inwards of an acting portion 5a and a reacting portion 5b of the caliper body 5. Additionally, a pads returning spring 7 is suspended over the friction pads 6, 6 for returning the friction pads 6, 6 in directions opposite to the disc rotor 2 or in directions in which they move away from the disc rotor 2.

The caliper body 5 includes the acting portion 5a and the reacting portion 5b which are provided on both sides of the disc rotor 2 and a bridge portion 5c which straddles an outer edge of the disc rotor 2 to connect the acting portion 5a and the reacting portion 5b together. A cylinder bore 5d is provided in the acting portion 5a, and an end of this cylinder bore 5d which faces the disc rotor 2 is opened. A bottomed cylindrical piston 8 is accommodated in the cylinder bore 5d, and the piston 8 is caused to move in the direction of the disc rotor 2 in the cylinder bore 5d by a hydraulic pressure supplied into a hydraulic pressure chamber 9 in a cylinder bore bottom portion. In addition, slider pin mounting arms 5e, 5e are provided at side portions of the acting portion 5a so as to project therefrom. Mounting bolts 10 are attached to distal ends of the slider pin mounting arms 5e so as to extend therefrom as the slider pins 4. Further, a rectangular ceiling opening portion 5f is formed in a substantially central portion of the bridge portion 5c so as to be opened radially outwards.

A piston seal mounting groove 5g and a dust seal mounting groove 5h are provided circumferentially in an inner circumferential surface of the cylinder bore 5d at an axially central portion and on an opening side thereof, respectively. Then, a piston seal 11 which pulls or rolls back the piston 8 from the rotor 2 is securely fitted in the piston seal mounting groove 5g, and a dust seal 12 which prevents the ingress of dust into the cylinder bore is securely fitted in the dust seal mounting groove 5h.

The caliper support arms 3a, 3a are shaped so that they extend along both side portions of the caliper bracket 3 in an axial direction while holding the bridge portion 5c therebetween to straddle the outer edge of the disc rotor 2 and further extend along a side wall of the reacting portion 5b in the direction of a disc center on the other side portion of the disc rotor 2. Distal end portions of the caliper support arms 3a, 3a are connected to each other by a tie rod 3b so as to enhance the rigidity of both the support arms 3a, 3a to which the braking torque is applied.

Guide holes 3c which accommodate individually the slider pins 4 are provided individually in the caliper support arms 3a. Additionally, pad guide portions 3d are provided individually on the caliper support arms 3a. A pair of pad guide portions 3d which face each other on one side of the disc rotor 2 include individually torque bearing surfaces 3e which face each other. Further, pad retainer mounting portions 3f where a pad retainer 13 is mounted are provided at radially outer sides of the pad guide portions 3d.

In each friction pad 6, lug pieces 6b, 6b are provided individually at both side portions of a back plate 6a so as to project therefrom, and a lining 6c is affixed to one side of the back plate 6a. The lug pieces 6b, 6b are movably supported by the pad guide portions 3d, 3d at a disc entrance side and exit side of the caliper body 5 by corresponding pad retainers 13. An engagement hole 6d for the pads returning spring 7 is formed in a radially outer side of a disc entrance side of the back plate 6a so as to be opened radially outwards.

The pads returning spring 7 is formed by bending a spring wire material and includes a base portion 7a which is disposed in the direction of a disc axis, a pair of first spring portions 7b, 7b which extend from both end portions of the base portion 7a along an outer circumference of the disc rotor 2 while moving away farther from each other as they so extend, and engagement portions 7c, 7c which projects individually from distal ends of the first spring portions 7b, 7b towards a center of the disc rotor 2. The base portion 7a includes a second spring portion 7d which is formed by depressing a middle portion in the direction of the disc axis into a V-shape and hence is formed substantially into an M-shape as a whole. The engagement portion 7c is bent substantially at right angles to the first spring portion 7b and extends from an opening end to a bottom portion end of the engagement hole 6d. In the pad returning spring 7, the engagement portions 7c, 7c are inserted into the corresponding engagement holes 6d, 6d in the friction pads 6, 6, and the base portion 7a is disposed in a position which corresponds to the ceiling opening portion 5f which lies between the friction pads 6, 6.

In the vehicle disc brake 1 which is formed in the way described above, when a working fluid whose pressure is increased by a brake-applying operation performed by the driver is supplied into a hydraulic pressure chamber 9, the piston 8 travels ahead in the cylinder bore 5d and pushes on the friction pad 6 on the acting portion 5a's side towards the disc rotor 2. The lug pieces 6b, 6b of the friction pad 6 on the acting portion's side move individually along the pad guide portions 3d, 3d via the corresponding pad retainers 13, 13 towards the disc rotor 2, whereby the lining 6c is brought into sliding contact with one side surface of the disc rotor 2. Following this, the caliper body 5 is moved in the direction of the acting portion 5a via the slider pins 4, 4 by a reaction force generated by the contact of the lining 6c with the disc rotor 2, whereby a reaction claw 5i which is provided on a side of the caliper body 5 where the reacting portion 5b lies pushes on the friction pad 6 on the reacting portion 5b's side towards the other surface side of the disc rotor 2. The lug pieces 6b, 6b of the friction pad 6 on the reacting portion's side move individually along the pad guide portions 3d, 3d via the corresponding pad retainers 13, 13 towards the disc rotor 2, whereby the lining 6c is brought into sliding contact with the other surface side of the disc rotor 2.

In the pad returning spring 7, as the friction pads 6, 6 move towards the disc rotor 2, the first spring portions 7b, 7b are elastically deformed, and the engagement portions 7c, 7c of the first spring portions 7b, 7b approach each other, whereafter the second spring portion 7d is elastically deformed nearly into a linear state from the V-shape state.

When the brake-applying operation is canceled to remove the hydraulic pressure applied whereby the piston 8 is pulled or rolled back by means of the restoring force of the piston seal 11, the piston 8 and the reaction claw 5i being withdrawn to their original positions before the brakes are applied, the first spring portions 7b, 7b of the pads returning spring 7 are restored to their initial states where the first spring portions 7b, 7b are spaced apart from each other about the base portion 7a by the restoration forces of the first spring portions 7b, 7b and the restoration forces of the second spring portion 7d. In association with this, the engagement portions 7c, 7c push on the corresponding friction pads 6, 6 via the engagement holes 6d, 6d to move the friction pads 6 towards directions opposite to the disc rotor 2 or in which the friction parts 6 move away from the disc rotor 2. The friction pads 6, 6 move along the corresponding pad guide portions 3d, 3d in the directions opposite to the disc rotor 2 so as to be pulled back from the disc rotor 2 with the lug pieces 6b, 6b being guided by the pad retainers 13, 13, whereby the linings 6c, 6c move away from the sides of the disc rotor 2.

In addition, in the pads returning spring 7, the first spring portions 7b, 7b remain elastically deformed over a period from an initial stage where the friction pads 6 are totally new to a stage where the friction pads 6 wear to a previously-set wear amount and which results just prior to a stage near a fully worn-out state (a pad replacement stage) in their service lives in an initial stage of brake application (that is, in a non-brake-applied position).

On the other hand, when the friction pad 6 wears beyond the previously-set wear amount, the first spring portions 7b, 7b are elastically deformed, which causes the engagement portions 7c, 7c to approach each other by a predetermined distance. Thereafter, when the first spring portions 7b, 7b are elastically deformed further, the first spring portions 7b, 7b are elastically deformed further, which causes the engagement portions 7c, 7c to approach each other further, whereby the second spring portion 7d is elastically deformed nearly into the linear state from the V-shape state. Thus, the first spring portions 7b, 7b and the second spring portion 7d are elastically deformed from the initial stage of brake application (refer to FIG. 6).

When the brake-applying operation is canceled to remove the hydraulic pressure applied whereby the piston 8 is pulled or rolled back by means of the restoring force of the piston seal 11, the piston 8 and the reaction claw 5i being restored to their original positions before the brakes are applied, the first spring portions 7b, 7b of the pads returning spring 7 are restored to their initial states where the first spring portions 7b, 7b are spaced apart from each other about the base portion 7a by the restoration forces of the first spring portions 7b, 7b and the second spring portion 7d. In association with this, the engagement portions 7c, 7c push on the corresponding friction pads 6, 6 via the engagement holes 6d, 6d to move the friction pads 6 towards directions opposite to the disc rotor 2 or in which the friction parts 6 move away from the disc rotor 2 with a strong force. The friction pads 6, 6 move along the corresponding pad guide portions 3d, 3d in the directions opposite to the disc rotor 2 so as to be pulled back from the disc rotor 2 with the lug pieces 6b, 6b being guided by the pad retainers 13, 13, whereby the linings 6c, 6c move away from the sides of the disc rotor 2 in an ensured fashion.

According to the pads returning spring 7 of this embodiment, when the friction pad 6 exceeds particularly the previously-set wear amount, the friction pads 6, 6 can be pulled from the disc rotor 2 by the restoring forces of the first spring portions 7b, 7b and the second spring portion 7d in an ensured fashion.

In addition, the engagement portions 7c, 7c of the pads returning spring 7 are in engagement with the disc entrance sides of the friction pads 6, 6 which result when the vehicle travels ahead, whereby the engagement portions 7c, 7c can pull the friction pads 6, 6 from the disc rotor 2 with good efficiency when the brakes are released and hydraulic pressure is removed. Further, the base portion 7a of the pads returning spring 7 is disposed in the position which corresponds to the ceiling opening portion 5f formed in the caliper body 5, whereby the base portion 7a can be visualized from the ceiling opening portion 5f.

Figure 7:
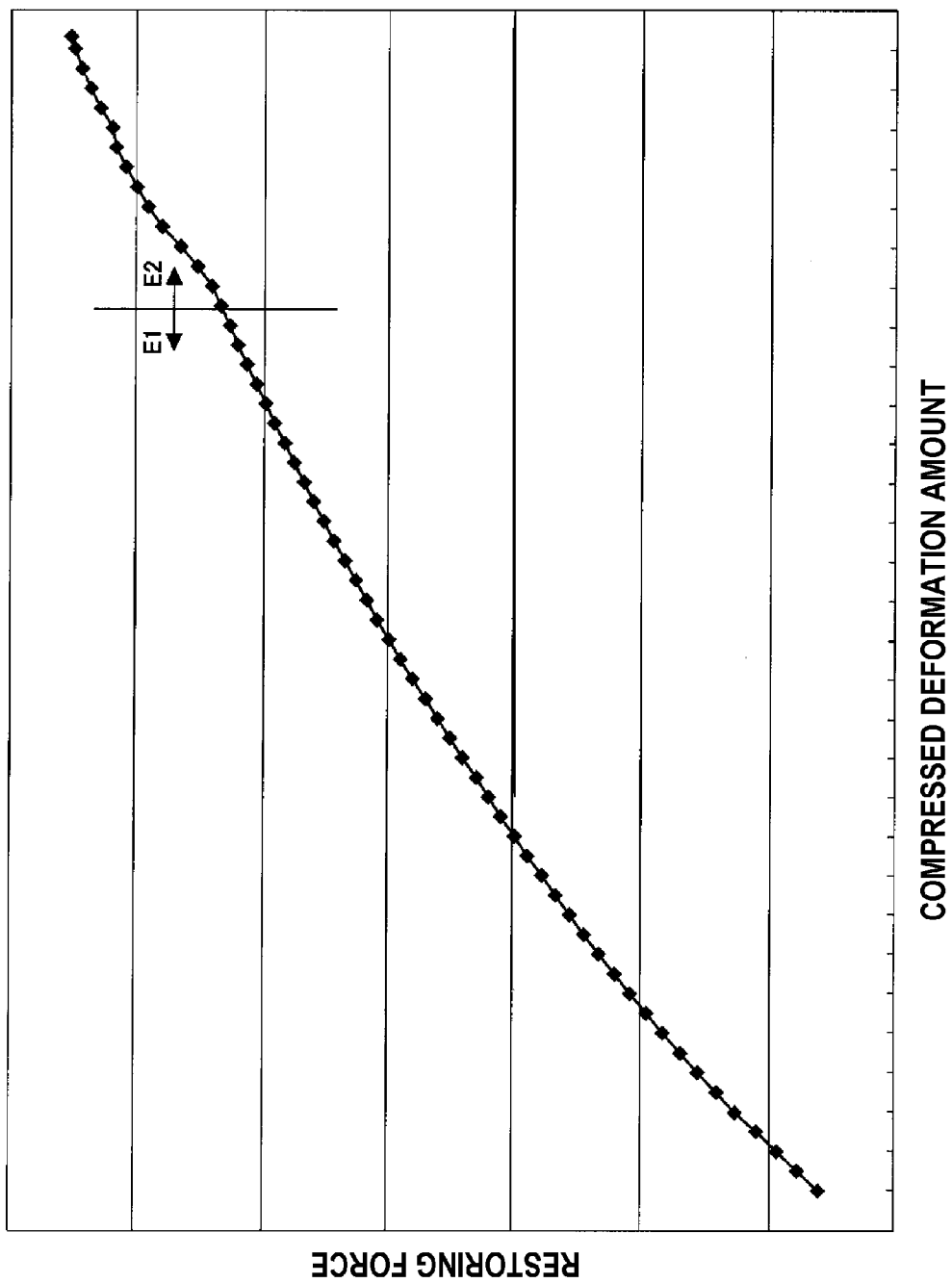
FIG. 7 is a graph showing a relationship between a compressed deformation amount and a restoring force of a pads returning spring of the vehicle disc brake.
Figure 8:
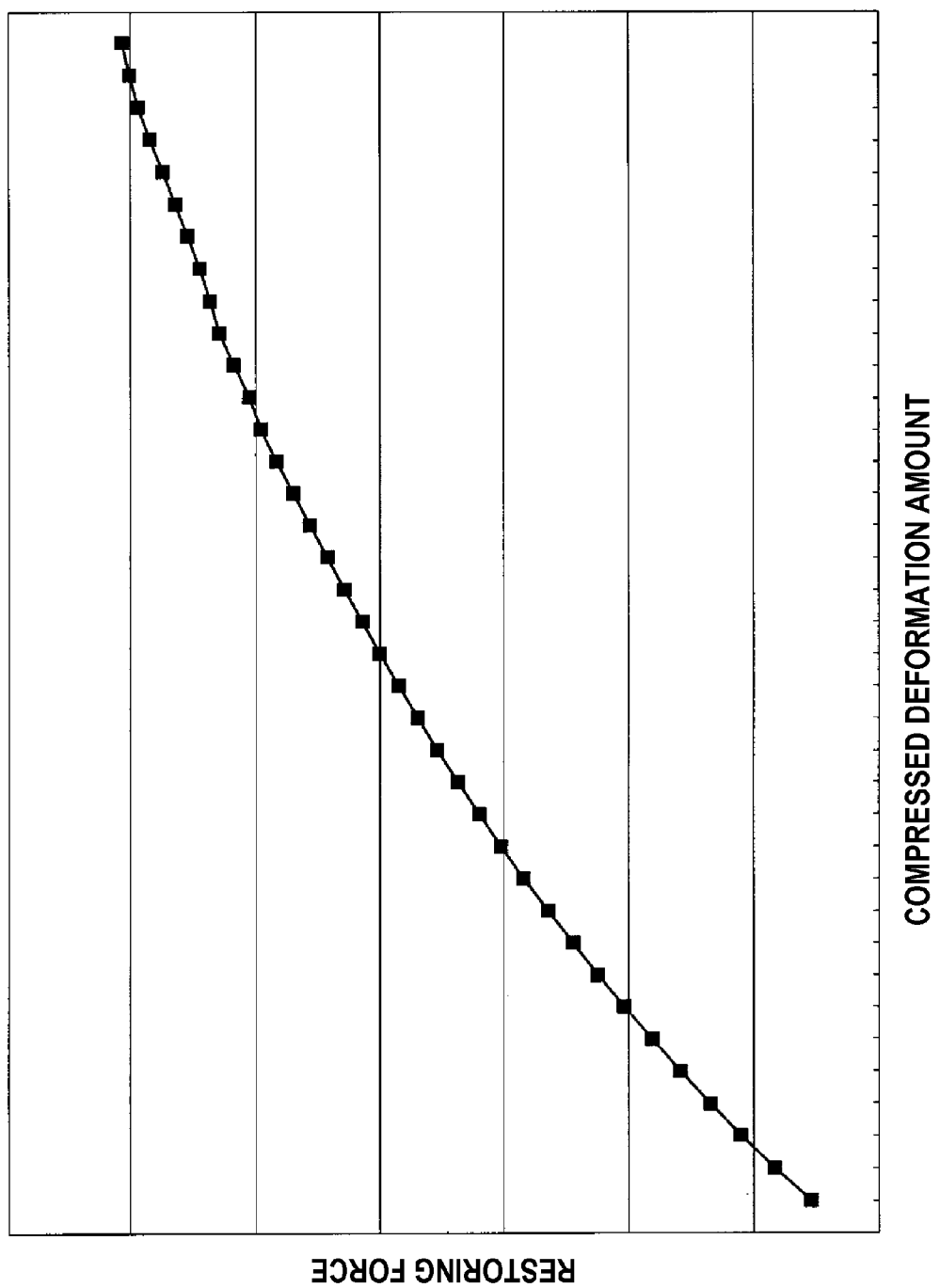
FIG. 8 is a graph showing a relationship between a compressed deformation amount and a restoring force of a conventional pads returning spring.

FIGS. 7 and 8 are graphs in which the compressed deformation amount of a pads returning spring is represented by an axis of abscissas and the restoring force of the pads returning spring is represented by an axis of ordinates. FIG. 7 shows a graph of the pads returning spring of this embodiment, and FIG. 8 shows a graph of a conventional pads returning spring in which a base portion 7a is formed into a straight line, without providing the second spring portion.

In the pads returning spring of this embodiment used in FIG. 7, in an initial stage of brake application, the compressed deformation amount of the pair of first spring portions increases and as a distance between the engagement portions becomes shorter, the restoring force increases gradually in constant proportion in an area E1 where the friction pads wear from a state where the pads are totally new to a previously-set wear amount. In addition, with the friction pads wearing to exceed the preset wear amount, the compressed deformation amount of the first spring portions exceeds the area E1 when the brakes are applied. When the first spring portions are elastically deformed further whereby the compressed deformation amount increases further, the second spring portion starts to be elastically deformed, and the restoring force increases quickly as shown in an area E2.

In the conventional pads returning spring used in FIG. 8, the compressed deformation amount of first spring portions increases from a state where the pads are totally new to a worn-out state, and as a distance between engagement portions becomes shorter, the restoring force increases gradually in constant proportion. Because of this, in the conventional pads returning spring, even though the friction pads wear to exceed a previously-set wear amount, it is not possible to pull the friction pads away from the disc rotor with a larger restoring force than the restoring force which has been applied until then.

It is noted that the vehicle disc brake of the invention is not limited to the embodiment described above. A configuration may be adopted in which engagement holes are also formed on disc exit sides of the friction pads so that a pads returning spring is also disposed on a disc exit side of the disc brake. In addition, a configuration may be adopted in which the pads returning spring is provided only on the disc exit side of the disc brake. Further, a plurality of pistons may be provided so as to be applied to a disc brake with a four-piston fixed caliper, for example. Furthermore, the vehicle disc brake of the invention can also be applied to a disc brake in which friction pads are suspended by hanger pins. In the invention, the previously-set wear amount is not limited to the wear amount which results just prior to the stage near the fully worn-out state and hence is arbitrary.

The invention claimed is:

1. A vehicle disc brake comprising:
   a disc rotor;
   a pair of friction pads disposed on both side portions of the disc rotor; and
   a pads returning spring suspended over radially outer sides of the friction pads and over an outer circumferential side of the disc rotor and configured to pull the friction pads away from the disc rotor when brakes are released and hydraulic pressure is removed, the pads returning spring having
      a base portion extending in an axial direction of the disc rotor,
      first spring portions extending from both end portions of the base portion along an outer circumference of the disc rotor while moving away from each other, and
      engagement portions provided individually at distal ends of the first spring portions so as to engage with the friction pads, and
   wherein a middle portion of the base portion in the axial direction of the disc rotor is depressed toward the distal ends of the first spring portions, thereby forming a second spring portion.

2. The vehicle disc brake of claim 1,
   wherein the pads returning spring is configured such that, when the brakes are applied, the second spring portion starts to be elastically deformed after the first spring portions are elastically deformed.

3. The vehicle disc brake of claim 1,
   wherein the pads returning spring is configured such that, when the brakes are not applied and the friction pads are in initial positions, only the first spring portions are elastically deformed as long as the friction pads are totally new or wear less than a previously-set wear amount, and both of the first spring portions and the second spring portion are elastically deformed if the friction pads wear more than the previously-set wear amount.

4. The vehicle disc brake of claim 1,
   wherein the engagement portions of the pads returning spring are brought into engagement with portions of the friction pads at a side from which the disc rotor enters into the vehicle disk brake when a vehicle travels ahead.

5. The vehicle disc brake of claim 1, further comprising:
   a caliper body which has a ceiling opening portion formed to visually expose the base portion therethrough.

6. The vehicle disc brake of claim 1,
   wherein the middle portion is depressed in the direction of the disc axis into a V-shape and the pads returning spring is formed substantially into an M-shape as a whole.

7. The vehicle disc brake of claim 6, further comprising engagement portions which project individually from distal ends of the first spring portions towards a center of the disc rotor.

8. The vehicle disc brake of claim 7,
   wherein the each of the engagement portions are bent substantially at right angles to each of the first spring portions.

9. The vehicle disc brake of claim 8,
   wherein the engagement portions are inserted into corresponding engagement holes in the friction pads on opposing sides of the disk rotor.

10. The vehicle disc brake of claim 9,
    wherein the base portion is disposed in a position which corresponds to a ceiling opening portion which lies between the friction pads.

11. The vehicle disc brake of claim 10,
    wherein as the friction pads move towards the disc rotor, the first spring portions are elastically deformed, and the engagement portions of the first spring portions approach each other, whereafter the second spring portion is elastically deformed nearly into a linear state from the V-shape.

12. A vehicle disc brake comprising:
    a pair of friction pads; and
    a pads returning spring suspended over radially outer sides of the friction pads and configured to pull the friction pads away from each other when brakes are released and hydraulic pressure is removed, the pads returning spring having
       a base portion,
       first spring portions extending from both end portions of the base portion while moving away from each other, and
       engagement portions provided individually at distal ends of the first spring portions, and
    wherein a middle portion of the base portion is bent inwardly in an axial direction towards the first spring portions, thereby forming a second spring portion.

13. The vehicle disc brake of claim 12,
    wherein the first spring portions are a pair of first spring portions which extend from both end portions of the base portion along an outer circumference of a disc rotor while moving away farther from each other as they so extend.

14. The vehicle disc brake of claim 13, further comprising engagement portions which project individually from distal ends of the first spring portions towards a center of the disc rotor.

15. The vehicle disc brake of claim 13,
    wherein the middle portion is depressed a middle portion in the direction of a disc axis into a V-shape and the pads returning spring is formed substantially into an M-shape as a whole.

16. The vehicle disc brake of claim 14,
    wherein each of the engagement portions are bent substantially at right angles to the first spring portions.

17. The vehicle disc brake of claim 14,
wherein the engagement portions are inserted into corresponding engagement holes in friction pads on opposing sides of the disk rotor.

18. The vehicle disc brake of claim 17,
wherein the base portion is disposed in a position which corresponds to a ceiling opening portion which lies between the friction pads.

19. The vehicle disc brake of claim 17,
wherein as the friction pads move towards the disc rotor, the first spring portions are elastically deformed, and the engagement portions of the first spring portions approach each other, whereafter the second spring portion is elastically deformed nearly into a linear state from the V-shape.

* * * * *